Dec. 26, 1967   J. GALLO, SR   3,360,025

DOUBLE EDGE HOLE SAW AND MANDREL

Filed Sept. 14, 1965

INVENTOR.
JOHN GALLO, SR.

BY Kimmel, Crowell & Weaver
ATTORNEYS.

United States Patent Office 3,360,025
Patented Dec. 26, 1967

3,360,025
DOUBLE EDGE HOLE SAW AND MANDREL
John Gallo, Sr., 64–66 Broad St.,
Boston, Mass. 02157
Filed Sept. 14, 1965, Ser. No. 487,283
12 Claims. (Cl. 145—130)

ABSTRACT OF THE DISCLOSURE

A hole saw comprising a tubular member provided with a cutting edge at both ends thereof and grooves or ridges on the interior surface thereof secured to a rotatable shaft by a selectively compressible resilient member, means for compressing the resilient member, and means for securing a pilot drill in the shaft are disclosed.

---

This invention relates broadly to cutting devices, and more particularly to a double edge hole saw releasably mounted on a rotatable shank.

It is a primary object of the instant invention to provide a hole saw made of a tubular member providing cutting teeth on each end thereof.

Another object of the instant invention is to provide a mandrel for releasably mounting a hole saw such that the saw may be readily removed.

Still another object of the instant invention is to provide a mandrel for releasably mounting a double edge hole saw such that the saw may be removed and manipulated to present the other cutting edge to the work.

A further object of the instant invention is to provide a hole saw having internal deformations cooperating with a mandrel for releasably retaining the saw.

A more specific object of the instant invention is to provide a hole saw having grooves or ridges internally thereof providing gripping means for a resilient mandrel.

Other objects and advantages of the instant invention reside in the combinations of elements, arrangements of parts, and features of construction and operation, all as will be more fully pointed out hereinafter and disclosed in the accompanying drawings wherein there are shown preferred embodiments of this inventive concept.

Figure 1:
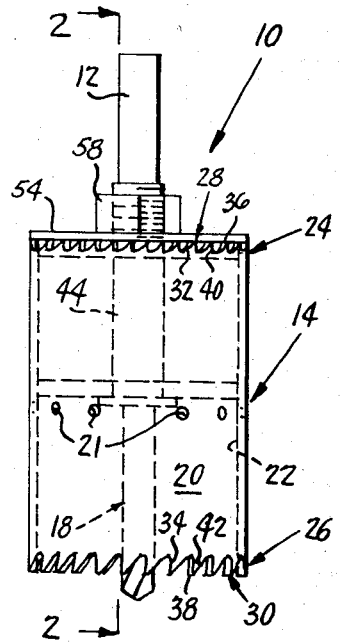
FIGURE 1 is a side elevational view of the hole saw and mandrel of the instant invention.

Referring now to the drawing in detail, wherein like reference characters designate like elements throughout the several views thereof, there is indicated generally at 10 a hole saw connected by any suitable arrangement to a rotatable shank 12 and having as its major components a tubular drill shown generally at 14 releasably secured to a mandrel designated generally at 16 carrying a pilot drill shown generally at 18.

Tubular drill 14 includes an annular tubular member 20 forming a passageway 22 therein which is illustrated as cylindrical, but which may be of any other suitable configuration, providing a plurality of vent holes 21, an upper circumferential edge shown generally at 24 and a lower circumferential edge designated generally at 26. Each of edges 24, 26 form cutting means including a plurality of cutting teeth shown generally at 28, 30 which are illustrated as being of different sizes to perform work of varying nature, but which may be of any suitable configuration, including configurations such as the inside and outside arrangement shown in my copending application Ser. No. 346,808, filed Feb. 24, 1964, now Patent No. 3,265,104.

Teeth 28, 30 preferably have one characteristic which is illustrated in FIGURE 1. Each of teeth 28, 30 has a first edge 32, 34 extending away from a cutting point 36, 38 and a second edge 40, 42 extending away from cutting points 36, 38 at a greater angle than first edges 32, 34. It will be seen that an extension of edges 34, 42 of teeth 30 will describe a plurality of helices about tubular member 20 which, when viewed from above hole saw 10, describe a counterclockwise helix.

Conversely, an imaginary extension of edges 32, 40 of teeth 28 describe a plurality of downwardly spiralling helices, which when viewed from above hole saw 10, describe a plurality of clockwise helices. As will be seen more fully hereinafter, the construction of teeth 28, 30 such that they are inclined in the same general direction allows tubular drill 14 to be removed with teeth 28 being placed on the lower edge thereof with teeth 28 being inclined in the same direction as teeth 30 as shown in FIGURE 1 such that shank 12 may be rotated in the same direction to perform a cutting operation with either of teeth 28 or teeth 30.

Mandrel 16 includes a central shaft 44 secured to shank 12 positioned along the longitudinal axis of tubular member 20 carrying a resilient block 46 which may be of any suitable nature, such as rubber, soft plastic and the like. Block 46 is preferably configured to be closely received by passageway 22 of tubular drill 14 as is indicated in FIGURES 2 and 3.

Central shaft 44 slidably carries a first circular plate 48 with a hexagonal limit flange 50 mounted on shaft 44 precluding the separation of shaft 44 and plate 48. A second circular plate 52 is slidably mounted on shaft 44 above resilient block 46 dimensioned to fit within passageway 22 of tubular drill 14.

Figure 2:
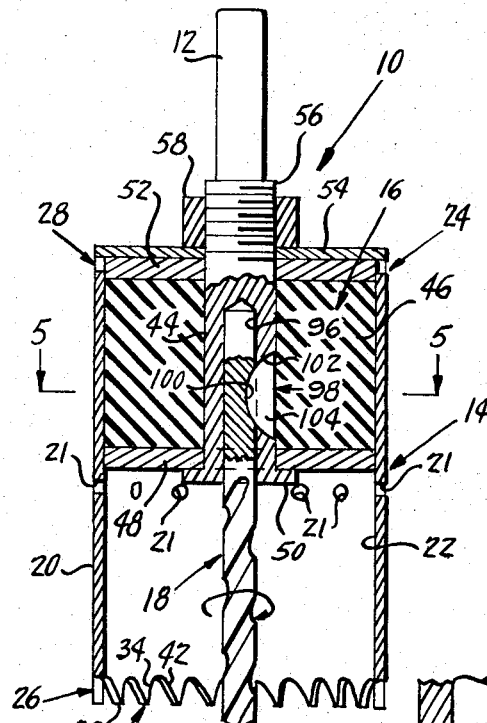
FIGURE 2 is a longitudinal cross-sectional view of the device of FIGURE 1 taken along line 2—2 thereof viewing in the direction of the arrows.
Figures 3, 4:
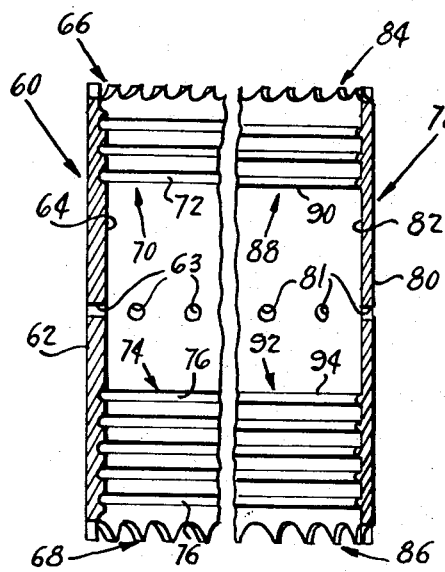
FIGURE 3 is a partial longitudinal cross-sectional view of another embodiment of tubular drill of the instant invention showing a plurality of interiorly positioned grooves for facilitating the securement of the drill to a resilient mandrel member.
FIGURE 4 is a partial longitudinal cross-sectional view of still another form of tubular drill illustrating a plurality of interiorly positioned ridges aiding in the securement of the drill to a resilient mandrel member.

A tooth engaging plate 54 is slidably mounted on shaft 44 and extends outwardly thereof to engage teeth 28 as may be seen in FIGURES 1 and 2. Tooth engaging plate 54 is preferably made of a rigid material of lesser hardness than teeth 28, 30 to provide support for tubular drill 14 and yet preclude damage to cutting points 36, 38. With plates 48, 52, 54 being made of a dielectric material such as hard plastic, and with pilot bit 18 removed, it will be seen that drill 14 is insulated from electrical shock as well as being substantially cushioned from mechanical vibrations providing a floating action of drill 14 against the work. The upper end of shaft 44 is equipped with a plurality of left hand threads 56 receiving a threaded nut 58 providing a self-tightening characteristic when drill 14 is rotated in a conventional manner.

In the assembly of mandrel 16 to tubular drill 14, shaft 44 is preferably freed from shank 12 with first plate 48, resilient block 46, second plate 52, and tooth engaging plate 54 being sequentially inserted thereon. Nut 58 is then threaded on threads 56 of shaft 44 with shaft 44 being secured to rotatable shank 12. Tubular drill 14 slidably receives mandrel 16 until teeth 28 engage plate 54. Tubular drill 14 is then restrained, as by holding hexagonal flange 50 with a hex socket, with nut 58 being threaded downwardy along shaft 44 thus creating a compressive force upon resilient block 46. Because block 46 is of a resilient nature, it will deform into close engagement with passageway 22 thus securing tubular drill 14 to mandrel 16.

When it is desired to remove tubular drill 14 from mandrel 16, it is necessary only to back off nut 58 until the compressive forces on resilient block 46 relax, allowing block 46 to return to its original shape. At this point tubular drill 14 may readily be removed from mandrel 16 and inverted with circumferential edge 26 of drill 14 being inserted on mandrel 16 to present teeth 28 for a cutting operation.

Referring now to FIGURE 3, another form of tubular drill is shown generally at 60 having an annular tubular member 62 forming vents 63 and an internal passageway 64 providing upper and lower circumferentially spaced teeth shown generally at 66, 68, which elements are generally similar to corresponding elements of tubular drill 14. A plurality of deformations shown generally at 70 are formed at one end of passageway 64 and include a plurality of grooves 72 circumferentially extending about the periphery of passageway 64. At the other end of passageway 64 adjacent teeth 68 are another plurality of deformations indicated generally at 74 including a series of parallel spaced apart circumferential grooves 76.

Tubular drill 60 is assembled on mandrel 16 in the same manner as drill 14 is secured, but it should be noted that grooves 72, 76 will receive portions of deformed resilient block 46 when nut 58 is tightened. It will be seen that these portions of resilient block 46 will reside against the lower edges of grooves 72 tending to resist any upward movement of drill 60 caused by the pressing of teeth 68 against the work.

Referring now to FIGURE 4, there is indicated generally at 68 another form of tubular drill having a tubular body 80 forming a plurality of vents 81 and an interior passageway 82, with a plurality of circumferential teeth shown generally at 84, 86 being formed on each end thereof, made in much the same manner as drills 14, 60. Positioned at one end of passageway 82 adjacent teeth 84 are a series of deformations 88 including peripherally extending ridges 90. Located at the other end of passageway 82 adjacent teeth 86 are another series of deformations 92 including circumferential ridges 94.

Ridges 90, 94 act to receive portions of deformed block 46 therebetween to prevent dislodgement of drill 78 from mandrel 16. It will be seen that each of ridges 90, 94 provides a shoulder against which deformed portions of resilient block 86 may engage thereby making the connection between drill 14 and mandrel 16 more secure.

It should be noted that deformations 70, 74, 88, 92 act in a similar manner to create a more secure engagement by providing a surface transverse to passageway 22 against which deformed portions of resilient block 46 may press. It should be noted that different numbers of grooves 72, 74 and ridges 90, 94 are provided at opposite ends of drills 60, 78. It has been found that different size and differently configured teeth may require a greater number of indentations to ensure a secure connection. In addition, the formation of grooves or ridges within drills 60, 78 is inherently a costly operation, the number of grooves or ridges being minimized consistent with a secure engagement. In addition, it may be found desirable to include grooves at one end of a tubular drill with ridges being formed at the other.

A pilot drill 18 may be fitted within a longitudinal blind opening 96 and central shaft 44 to provide a pilot for drills 14, 60, 78. Pilot drill 18 may be of any suitable nature, its only requirement being that it extends below the plane of teeth 30 as may be seen in FIGURE 2. Pilot drills are customarily secured to a central shank by a set screw or the like extending beyond the periphery thereof.

In the construction of the instant invention, this has been found very disadvantageous since first plate 48 and resilient block 46 must be slidably mounted on shaft 44 in order to create the proper compressive forces.

Accordingly, a connection means shown generally at 98 secures pilot 18 to central shaft 44 and is flush with the external surface thereof. Connecting means 98 includes a blind opening 100 formed in pilot drill 18 perpendicular to the longitudinal axis thereof. A smooth opening 102 is formed in central shaft 44 aligned with opening 100 of pilot 18. As may be seen in FIGURE 2, openings 100, 102 cooperate to form an aperture configured to receive a key 104 which represents a segment of a circle. As will be readily apparent, key 104 cannot pass into opening 96 of central shaft 44 and will be held in place by the compressive forces imparted to resilient block 46.

It will be seen that the upper end of blind opening 96 and key 104 will cooperate to maintain pilot drill 18 in central shaft 44. On the other hand, however, a tensile force exerted on the free end of pilot drill 18 will cam key 104 outwardly of opening 100 in pilot 18 allowing pilot 18 to be readily removed. As soon as key 104 has cleared the end of pilot 18, the compressive forces of resilient member will return key 104 to the position shown in FIGURE 2. When it is desired to insert another pilot drill into opening 96, it is necessary only to insert the connecting end thereof into opening 96 and rotating the same until key 104 and opening 100 become aligned.

Figures 5, 6:
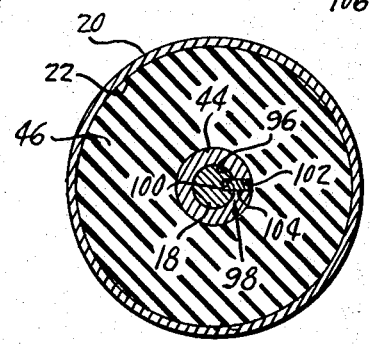
FIGURE 5 is a transverse cross-sectional view of the device of FIGURE 2 taken substantially along line 5—5 thereof viewing in the direction of the arrows and illustrating one form of connecting means.
FIGURE 6 is a representative cross-sectional view of another form of connecting means of the instant invention, certain parts being broken away for clarity of illustrations.

Another form of connecting means is shown generally at 106 in FIGURE 6 and includes an opening 108 formed in the shank of pilot drill 18 with a threaded opening 110 being formed in central shaft 44 aligned with opening 108. An Allen screw 112 is threaded into opening 110 until it is flush with the external surface of central shaft 44 thereby extending into opening 108 of pilot drill 14.

It is now seen that there is herein provided an improved hole saw having all of the objects of this invention and others, including many advantages of great practical utility and commercial importance.

Since many embodiments may be made of the instant inventive concept and since many modifications may be made in the embodiments hereinbefore shown and described, it is to be understood that the foregoing is to be interpreted merely as illustrative and not in a limiting sense.

I claim:
1. A hole saw which, in combination, comprises:
   a tubular saw member having a cutting edge on at least one end thereof;
   a rotatable shaft extending into the tubular member from one end for driving the saw, said shaft including a hole in the end thereof for receiving a pilot drill and a passage in the side thereof communicating with the hole for receiving a key;
   an annular resilient member snugly received on the shaft inside the tubular member for engaging the shaft and the interior wall of the tubular member; and
   means on the shaft for compressing the resilient member axially for expanding said member radially inwardly and outwardly for gripping both the shaft and the interior wall of the tubular member to thereby transmit rotary force from the shaft to the tubular member to thereby rotatably drive the saw; and
   a key received in said passage, said key being resiliently secured in said passage by the resilient member such that a portion of the key extends into said hole for engagement with a pilot drill having an aligned aperture therein whereby said drill is secured in said hole when said resilient member is axially compressed.

2. The structure of claim 1 wherein said passageway of said tubular member is substantially circular, said resilient block is cylindrical, and each of said first and second plates is circular, 3. The structure of claim 2 wherein said tubular member includes a plurality of deformations interiorly of said passageway adjacent said resilient member facilitating the securement of said tubular member to said member.

4. The structure of claim 2 wherein said deformations include a plurality of grooves.

5. The structure of claim 3 wherein said deformations include a plurality of ridges.

6. The saw of claim 1 further comprising:
an annular member secured on the shaft and composed of a material relatively softer than the material of the tubular saw member, said annular member extending at least to the tubular member for engaging an end of the tubular member for preventing axial movement of the tubular member relative to the shaft.

7. A hole saw which, in combination, comprises:
a tubular saw member having a cutting edge on both ends thereof;
a rotatable shaft extending into the tubular member from one end for driving the saw;
an annular resilient member snugly received on the shaft inside the tubular member for engaging the shaft and the interior wall of the tubular member;
means on the shaft for compressing the resilient member axially for expanding said member radially inwardly and outwardly for gripping both the shaft and the interior wall of the tubular member to thereby transmit force from the shaft to the tubular member to thereby rotatably drive the saw; and
an annular disc secured on the shaft and composed of a material which is relatively softer than the material of the tubular member, said disc extending at least to the tubular member for engaging the cutting edge on an end of the tubular member for protecting the cutting edge and preventing axial movement of the tubular member.

8. The structure of claim 7 wherein said tubular member includes a plurality of deformations interiorly of said passageway adjacent said resilient member facilitating the securement of said tubular member to said member.

9. The structure of claim 8 wherein said deformations include a plurality of grooves.

10. The structure of claim 8 wherein said deformations include a plurality of ridges.

11. The saw of claim 7 wherein the tubular member includes at least one aperture extending through the walls thereof.

12. The saw of claim 7 wherein the means for compressing the resilient member axially comprises:
an outwardly extending flange on the shaft;
an apertured plate engaged by the flange on one side of the resilient member and a second apertured plate on the shaft on the other side of the resilient member; and
a nut threadably received on the shaft for moving the first and second apertured plates relatively toward each other to compress the resilient member.

References Cited

UNITED STATES PATENTS

| | | | |
|---|---|---|---|
| 574,763 | 1/1897 | Rudolph | 279—2 X |
| 1,518,026 | 12/1924 | Van Sluys. | |
| 2,674,026 | 4/1954 | Palley | 279—2 X |
| 3,104,564 | 9/1963 | Hougen | 77—69 |

FOREIGN PATENTS 658,147  2/1963  Canada.

WILLIAM FELDMAN, *Primary Examiner.*

R. V. PARKER, *Examiner.*